(12) United States Patent
Thellefsen et al.

(10) Patent No.: US 11,691,877 B2
(45) Date of Patent: Jul. 4, 2023

(54) METHOD FOR PRODUCTION OF SULFUR AND SULFURIC ACID

(71) Applicant: HALDOR TOPSØE A/S, Kgs. Lyngby (DK)

(72) Inventors: Morten Thellefsen, Hillerød (DK); Per Aggerholm Sørensen, Kgs. Lyngby (DK); Martin Møllerhøj, Birkerød (DK); Mads Lykke, Brønshøj (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 0 days.

(21) Appl. No.: 17/594,680

(22) PCT Filed: Apr. 30, 2020

(86) PCT No.: PCT/EP2020/061934
§ 371 (c)(1),
(2) Date: Oct. 26, 2021

(87) PCT Pub. No.: WO2020/225060
PCT Pub. Date: Nov. 12, 2020

(65) Prior Publication Data
US 2022/0177307 A1    Jun. 9, 2022

(30) Foreign Application Priority Data

May 3, 2019   (DK) ............................ PA 2019 00543
May 28, 2019  (DK) ............................ PA 2019 00655
(Continued)

(51) Int. Cl.
*C01B 17/02* (2006.01)
*C01B 17/04* (2006.01)
(Continued)

(52) U.S. Cl.
CPC ...... *C01B 17/0404* (2013.01); *B01D 53/1481* (2013.01); *B01D 53/1493* (2013.01);
(Continued)

(58) Field of Classification Search
CPC . C01B 17/0404; C01B 17/80; C01B 17/0253; C01B 17/0447; C01B 17/0452;
(Continued)

(56) References Cited

U.S. PATENT DOCUMENTS 3,617,221 A * 11/1971 Egan .................. C01B 17/0413
423/576.2
4,070,424 A    1/1978 Olson et al.
(Continued)

FOREIGN PATENT DOCUMENTS

CN    106219499 A    12/2016
CN    107311117 A    11/2017
(Continued)

OTHER PUBLICATIONS

Danish Search Report dated Dec. 4, 2019 by the Danish Patent and Trademark Office in corresponding Danish Patent Application No. PA 2019 00681. (9 pages).
(Continued)

*Primary Examiner* — Timothy C Vanoy
(74) *Attorney, Agent, or Firm* — Buchanan Ingersoll & Rooney P.C.

(57) ABSTRACT

A process plant and a process for production of sulfur from a feedstock gas including from 15% to 100 vol % $H_2S$ and a stream of sulfuric acid, the process including a) providing a Claus reaction furnace feed stream with a substoichiometric amount of oxygen, b) directing to a Claus reaction furnace operating at elevated temperature, c) cooling to provide a cooled Claus converter feed gas, d) directing to contact a material catalytically active in the Claus reaction,
(Continued)

Figure 1:
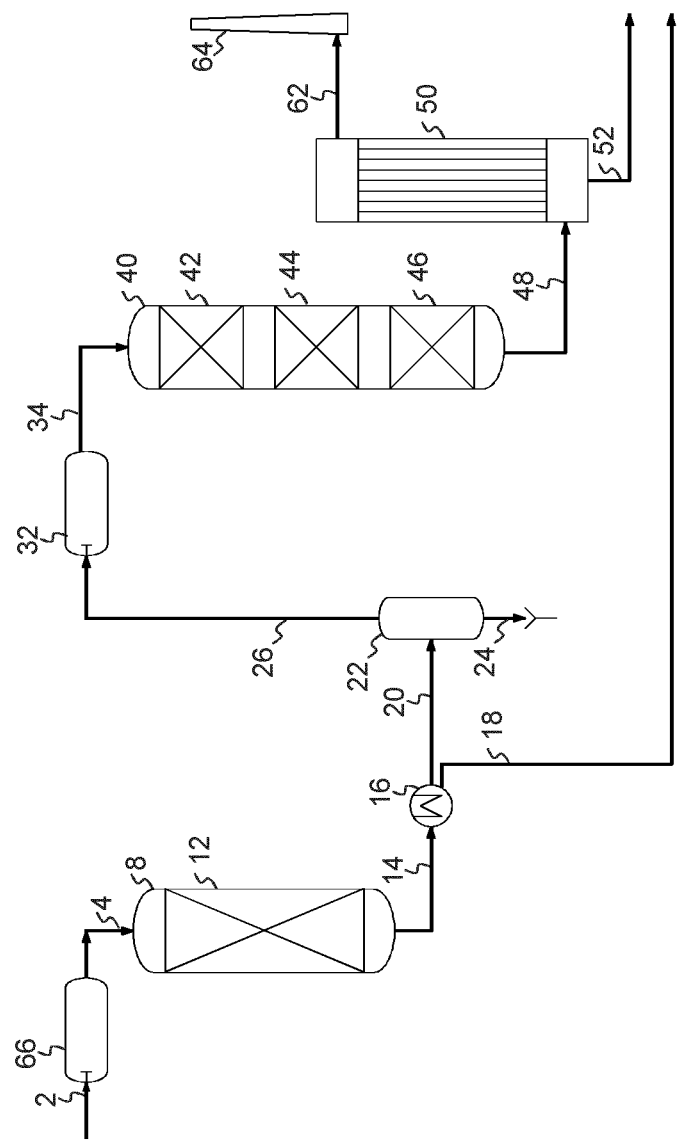

e) withdrawing a Claus tail gas and elementary sulfur, f) directing a stream comprising said Claus tail gas to a Claus tail gas treatment, wherein sulfuric acid directed to said Claus reaction furnace is in the form of droplets with 90% of the mass of the droplets having a diameter below 500 μm, with the associated benefit of such a process efficiently converting all liquid $H_2SO_4$ to gaseous $H_2SO_4$ and further to $SO_2$.

12 Claims, 3 Drawing Sheets

(30) Foreign Application Priority Data

Jun. 4, 2019 (DK) .......................... PA 2019 00681
Jun. 5, 2019 (DK) .......................... PA 2019 00687

(51) Int. Cl.
| | | |
|---|---|---|
| C01B 17/80 | (2006.01) | |
| B01D 53/86 | (2006.01) | |
| B01J 19/00 | (2006.01) | |
| B01J 19/24 | (2006.01) | |
| C01B 17/775 | (2006.01) | |
| B01D 53/14 | (2006.01) | |
| C01B 17/76 | (2006.01) | |
| F23G 7/06 | (2006.01) | |

(52) U.S. Cl.
CPC ...... *B01D 53/8615* (2013.01); *B01J 19/0013* (2013.01); *B01J 19/2405* (2013.01); *B01J 19/2465* (2013.01); *C01B 17/0253* (2013.01); *C01B 17/0447* (2013.01); *C01B 17/0452* (2013.01); *C01B 17/0456* (2013.01); *C01B 17/76* (2013.01); *C01B 17/775* (2013.01); *C01B 17/80* (2013.01); *C01B 17/806* (2013.01); *F23G 7/06* (2013.01); *B01D 2255/20723* (2013.01); *B01J 2219/00157* (2013.01); *C01P 2006/80* (2013.01); *F23G 2209/14* (2013.01)

(58) Field of Classification Search
CPC . C01B 17/0456; C01B 17/775; C01B 17/806; B01D 53/8615; B01D 53/1481; B01D 53/1493; B01D 2255/20723; B01J 19/0013; B01J 19/2405; B01J 19/2465; B01J 2219/00157; F23G 7/06; F23G 2209/14; C01P 2006/80
See application file for complete search history.

(56) References Cited

U.S. PATENT DOCUMENTS

| | | |
|---|---|---|
| 4,208,192 A | 6/1980 | Quigley et al. |
| 4,826,670 A | 5/1989 | Hegarty |
| 5,278,123 A | 1/1994 | Chopin et al. |
| 6,056,936 A | 5/2000 | Nougayrede et al. |
| 2009/0226353 A1 | 9/2009 | Tekie et al. |
| 2017/0044015 A1 | 2/2017 | Rameshni et al. |
| 2022/0177306 A1 | 6/2022 | Thellefsen et al. |
| 2022/0227625 A1 | 7/2022 | Thellefsen et al. |
| 2022/0234891 A1 | 7/2022 | Thellefsen et al. |

FOREIGN PATENT DOCUMENTS

| | | |
|---|---|---|
| CN | 207468199 U | 6/2018 |
| DE | 2430909 A1 | 1/1976 |
| EP | 0134594 A1 | 3/1985 |
| EP | 0633219 A1 | 1/1995 |
| EP | 2878358 A1 | 6/2015 |
| EP | 2878367 A1 | 6/2015 |
| WO | 2012089776 A1 | 7/2012 |
| WO | 2012152919 A1 | 11/2012 |
| WO | 2016198369 A1 | 12/2016 |
| WO | 2017220655 A1 | 12/2017 |
| WO | 2018096178 A1 | 5/2018 |
| WO | 2018169903 A1 | 9/2018 |

OTHER PUBLICATIONS

Danish Search Report dated Dec. 6, 2019 by the Danish Patent and Trademark Office in corresponding Danish Patent Application No. PA 2019 00687. (9 pages).
Danish Search Report dated Oct. 29, 2019 by the Danish Patent and Trademark Office in corresponding Danish Patent Application No. PA 2019 00655. (10 pages).
Danish Search Report dated Oct. 9, 2019 by the Danish Patent and Trademark Office in corresponding Danish Patent Application No. PA 2019 00543. (10 pages).
International Search Report (PCT/ISA/210) and Written Opinion (PCT/ISA/237) dated Jul. 17, 2020, by the European Patent Office as the International Searching Authority for International Application No. PCT/EP2020/061934. (12 pages).
International Search Report (PCT/ISA/210) and Written Opinion (PCT/ISA/237) dated Jul. 14, 2020, by the European Patent Office as the International Searching Authority for International Application No. PCT/EP2020/061940. (9 pages).
International Search Report (PCT/ISA/210) and Written Opinion (PCT/ISA/237) dated Jul. 29, 2020, by the European Patent Office as the International Searching Authority for International Application No. PCT/EP2020/061939. (9 pages).
International Search Report (PCT/ISA/210) and Written Opinion (PCT/ISA/237) dated Jun. 29, 2020, by the European Patent Office as the International Searching Authority for International Application No. PCT/EP2020/061937. (8 pages).

\* cited by examiner

METHOD FOR PRODUCTION OF SULFUR AND SULFURIC ACID

The present invention is related to a process for conversion of $H_2S$ to elemental sulfur and sulfuric acid, optionally with an adjustable ratio between elemental sulfur and sulfuric acid.

$H_2S$ is a common side product in many processes, including hydrodesulfurization of refinery streams and production of viscose. It is desirable to convert $H_2S$ prior to emission to the atmosphere as $H_2S$ is highly toxic, odorous and an environmental challenge.

Refinery processes, besides producing the well-known high concentration $H_2S$ gas, may often also produce a so-called sour water stripper gas, which comprises $H_2S$, $H_2O$ and $NH_3$ in roughly equal molar amounts.

Especially in refineries, the chosen process for $H_2S$ abatement has been the Claus process, which has been known and optimized for more the 8 decades. The Claus process proceeds by sub-stoichiometric combustion of $H_2S$ producing $SO_2$ in a Claus reaction furnace, providing a Claus converter feed gas. The subsequent Claus process stages convert $H_2S$ and $SO_2$ to form elemental sulfur, which may be condensed and withdrawn.

Typically, the sulfur removal efficiency of the Claus process is 95% to 98%, which is insufficient for environmental compliance. Therefore, it is common practice to provide a tail gas treatment after the Claus process to provide sulfur abatement above 99%. The tail gas treatment is sometimes a sulfuric acid plant, which introduces the requirement for handling of sulfuric acid.

It has now been identified that the sulfuric acid may be recycled to the Claus reaction furnace, where it may contribute to the formation of sulfur, and in addition provide opportunities for optimization of the Claus process equipment sizing and operation costs.

In WO 2012/152919 A1, a sulfuric acid process for treatment of Claus tail gas is presented in which the conversion of $H_2S$ to $H_2SO_4$ in a Claus tail gas is described. The steps in the process are:
1. Sub-stoichiometric oxidation
2. Claus conversion
3. Oxidation of reduced sulfur species ($H_2S$) in the Claus tail gas in oxygen rich atmosphere at 400-700° C.
4. Catalytic oxidation of $SO_2$ to $SO_3$
5. Condensation of $H_2SO_4$ It is recognized that the $H_2SO_4$ product is not always desired and it is suggested to recycle the sulfuric acid to an upstream Claus reaction furnace or the $H_2S$ oxidation step as described above. However, the recycling of sulfuric acid is merely thought as an abatement of sulfuric acid, and the consequences of recycling the $H_2SO_4$ on the wet sulfuric acid or Claus process have not been evaluated, i.e. it is not recognized that $H_2SO_4$ recirculation makes it possible to reduce the amount of $O_2$ (in the form of air, enriched air or pure oxygen) directed to the Claus reaction furnace, nor are the beneficial effects on the Claus and sulfuric acid processes realized.

In WO 2012/152919 A1 it is also recognized that support fuel may be required in both the Claus reaction furnace and $H_2S$ oxidation step to obtain the desired operating temperature, without realizing the beneficial effects of using feedstock gases as support fuel for the $H_2S$ oxidation in the sulfuric acid process.

The proposal to recycle $H_2SO_4$ to the Claus reaction furnace will therefore in itself not provide a working process, but require additional process modifications.

According to the present invention a process for conversion of $H_2S$ to elemental sulfur with increased efficiency is presented, in which a Claus process is combined with a sulfuric acid process. According to this process, sulfuric acid produced in the sulfuric acid process, treating the Claus tail gas, is recycled to the Claus reaction furnace for decomposition and elemental sulfur production.

For the purpose of the present application, a stoichiometric amount of oxygen shall be defined under the assumption that the products derived from N, H, C, S and O in the feed gas are $N_2$, $H_2O$, $CO_2$ and $SO_2$. If less than a stoichiometric amount of oxygen is present (also called sub-stoichiometric), this means that not all feed components are fully oxidized. For a Claus gas feed, this means that the process gas after sub-stoichiometric combustion/reaction may contain unconverted $H_2S$, $NH_3$ and hydrocarbons from the feed stream(s) and $H_2$, CO, COS and $CS_2$ formed in the $O_2$ deficient environment.

For the purpose of the present application, a fuel shall be defined as a substance having a composition which, when oxidized with $O_2$ will form $N_2$, $H_2O$, $CO_2$ and $SO_2$ as the reaction product and release a substantial amount of energy by the reactions. A mixture of hydrocarbons (e.g. natural gas, with $CH_4$ and $C_2H_6$) as well as $H_2S$ is a typical fuel gas, but the fuel gas could also comprise CO, $NH_3$ and $H_2$.

For the purpose of the present application, oxygen ($O_2$) is understood as a stream containing $O_2$, such as air, enriched air and pure oxygen, but could also be another gas containing $O_2$.

In a broad aspect the present invention relates to a process for production of sulfur from a feedstock gas comprising from 15%, 20%, 30 vol %, 40 vol % or 50% to 99 vol % or 100 vol % $H_2S$ and a stream of sulfuric acid involving the steps of
a. providing a Claus reaction furnace feed stream comprising said feedstock gas, an amount of sulfuric acid, an amount of oxygen and optionally an amount of fuel, wherein the amount of oxygen is substoichiometric,
b. directing said Claus reaction furnace feed stream to a Claus reaction furnace operating at elevated temperature, such as above 900° C., providing a Claus converter feed gas
c. cooling said Claus converter feed gas to provide a cooled Claus converter feed gas and optionally withdrawing elemental sulfur from the gas
d. directing said cooled Claus converter feed gas after optional reheating to contact a material catalytically active in the Claus reaction,
e. withdrawing a Claus tail gas and elemental sulfur, optionally by cooling the effluent from said material catalytically active in the Claus reaction,
f. directing a stream comprising said Claus tail gas to a Claus tail gas treatment,
wherein said sulfuric acid directed to said Claus reaction furnace being in the form of droplets with a droplet size distribution characterized by 90% of the mass of the droplets having a diameter below 500 μm, 200 μm or 100 μm with the associated benefit of such a process efficiently converting all liquid $H_2SO_4$ to gaseous $H_2SO_4$ and further to $SO_3$ and eventually to $SO_2$, which is well suited for a Claus process.

In a further embodiment at least an amount of the sulfuric acid is directed to said Claus reaction furnace via at least one pneumatic nozzle, receiving sulfuric acid and an atomization medium, with the associated benefit of such a nozzle forming small droplets, suitable for fast evaporation. Pneumatic nozzles are also known to the skilled person under the terms two fluid nozzles or two-phase nozzles.

In a further embodiment the atomization medium is compressed air and the flow is from 25 Nm³ air/ton acid or 50 Nm³ air/ton acid to 200 Nm³ air/ton acid or 500 Nm³ air/ton acid with the associated benefit of such a nozzle operating under these parameters forming small droplets, with low consumption of atomization media.

In a further embodiment at least an amount of the sulfuric acid is directed to said Claus reaction furnace via at least one hydraulic nozzle, designed for formation of small droplets, with the associated benefit of a hydraulic nozzle being simple to operate while providing sufficiently small droplets, without diluting the process gas with any atomization media In a further embodiment the average process gas residence time in the Claus reaction furnace is less than 5 seconds, more preferably less than 2 seconds, with the associated benefit of such a reaction furnace having an appropriate size, while allowing sufficient time for evaporation of sulfuric acid droplets as well as the required partial chemical conversion of $H_2S$ and $SO_2$ to elemental sulfur In a further embodiment the Claus reaction furnace comprises one or more turbulence enhancer(s), with the associated benefit of narrowing the residence time, temperature and gas composition distribution in the Claus reaction furnace.

In a further embodiment the Claus reaction furnace comprises a means of impaction, such as an impaction wall or a volume packed with inert material, with the associated benefit of destroying droplets by collision, to ensure absence of liquid $H_2SO_4$ in the Claus converter feed gas.

In a further embodiment said Claus tail gas treatment involves the steps of
  g. directing a stream comprising said Claus tail gas, oxygen and a fuel as a feedstock gas to a Claus tail gas combustor operating at a temperature above 900° C. or a catalytic means for oxidation providing an $SO_2$ converter feed gas,
  h. directing said $SO_2$ converter feed gas to contact a material catalytically active in $SO_2$ oxidation to $SO_3$, providing an $SO_3$ rich gas,
  i. converting said $SO_3$ rich gas to concentrated sulfuric acid, either by absorption of $SO_3$ in sulfuric acid or by hydration of $SO_3$, cooling and condensation of sulfuric acid,
  j. recycling at least a part of the produced sulfuric acid to the Claus reaction furnace,
with the associated benefit of such a process having a high conversion and thermal efficiency and avoiding undesired production of sulfuric acid. The use of a Claus reaction furnace and a Claus tail gas combustor operating above 900° C. has the effect of ensuring complete conversion of the constituents present, and this may optionally require the presence of a fuel in addition to the feedstock gas. In addition, homogeneous Claus reactions will take place in the Claus reaction furnace, such that sulfur may be withdrawn when the Claus converter feed gas is cooled. The stream fed to the Claus tail gas combustor may typically include $H_2S$ as fuel from the Claus tail gas and/or a separate stream comprising $H_2S$, hydrocarbon or other fuels. In addition to the mentioned process steps the process may include further steps such as heat exchange for changing the temperature (or in other ways conditioning the process streams) to an appropriate range for the processes occurring.

In a further embodiment the Claus reaction furnace feedstock gas comprises less than 0.1 vol % non-elemental nitrogen, such as $NH_3$, with the associated benefit of avoiding formation of e.g. ammonium salts which may plug the Claus condenser(s).

In a further embodiment the Claus reaction furnace feed stream comprises less than 50%, 20%, 10% or 1% elemental nitrogen with the associated benefit of providing a process with a high temperature in the Claus reaction furnace, and a reduced process gas volume, due to the reduced presence of $N_2$, while avoiding excessive temperatures downstream as the evaporation of sulfuric acid cools the process gas. This can be accomplished by using pure $O_2$ or oxygen enriched air as the oxygen source.

In an alternative process, steps d and e are carried out sequentially 2-5 times, with the associated benefit of enabling a higher conversion in the process In a further embodiment the $H_2S:SO_2$ ratio of said Claus converter feed gas is below 4:1, 3:1 or 2:1, with the associated benefit of such a feed gas providing a $H_2S$ containing Claus tail gas to the Claus tail gas combustor, minimizing the need for fuel gas addition as the $H_2S$ oxidation releases a substantial amount of energy, whereas $SO_2$ does not release energy in the Claus tail gas combustor.

In a further embodiment, the $H_2S:SO_2$ ratio of said Claus converter gas is below 1.6:1, 1.8:1 or 2:1, with the associated benefit of having a substantially $H_2S$ free Claus tail gas. In the downstream sulfuric acid plant this can be an advantage as the $SO_2$ will not oxidize without a $SO_2$ conversion catalyst and thus it will be possible to preheat the Claus tail gas with a combination of catalytic $H_2S$ oxidation (controlled bypass of feedstock gas containing $H_2S$) and process gas recycle around the catalytic $H_2S$ oxidation, such that the temperature increase across the $H_2S$ oxidation catalyst can be closely controlled. With unknown and/or varying $H_2S$ concentration in the Claus tail gas, the risk of overheating the $H_2S$ oxidation catalyst is high.

In a further embodiment the process further comprises the step of directing an amount of a further feedstock gas to said Claus tail gas combustor, with the associated benefit of providing additional sulfur and fuel to the sulfuric acid process. The further feedstock gas may comprise impurities, which may be incinerated prior to the treatment in the sulfuric acid process, and/or hydrogen sulfide and other fuels which may contribute to the sulfuric acid production and the combustion in the Claus tail gas combustor. If the further feedstock gas comprises a high amount of inert gases or sulfur free fuels, the process also has the benefit of avoiding an increase in Claus converter size due to a non-contributing flow. The further feedstock gas may originate from the same source as the feedstock gas or it may originate from a different source.

In a further embodiment said further feedstock gas comprises more than 5 vol % non-elemental nitrogen, such as ammonia, with the associated benefit of enabling a process where the non-elemental nitrogen constituents, which may be difficult to oxidize in the sub-stoichiometric atmosphere of the Claus reaction furnace, can be directed to the Claus tail gas combustor. Such a process may be especially beneficial if the further feedstock gas is a sour water stripper (SWS) gas comprising 10 vol %-50 vol % $H_2S$, 10 vol %-50 vol % $NH_3$ and 10 vol %-50 vol % $H_2O$—of which only $H_2S$ is desired in the Claus process, and $NH_3$ is problematic in the Claus process due to potential plugging by ammonium salts. Instead such a SWS gas may be directed to the sulfuric acid plant, where it is well established to handle $NH_3$ because of the excess of oxygen prevailing there.

In a further embodiment the amount of sulfur in the further feedstock gas is at least 1%, 2% or 5% of the total amount of elemental sulfur withdrawn from the process, with the associated benefit of such a feedstock gas being able to provide thermal energy while also contributing to the sulfur abatement.

In a further embodiment the material catalytically active in the Claus reaction comprises activated aluminum(III) oxide or titanium(IV) oxide with the associated benefit of such a material providing an efficient process for production of elemental sulfur.

In a further embodiment step (d) is carried out under a pressure of 200 mbar g to 700 mbar g, a temperature of 200° C. to 350° C. and a space velocity of 800 Nm³/h/m³ to 3000 Nm³/h/m³, with the associated benefit of such conditions being efficient for the production of elemental sulfur.

In a further embodiment step (d) is carried out at a temperature of 100° C. to 150° C. and step (e) involves the step of periodically heating said material catalytically active in the Claus reaction to allow withdrawal of condensed elementary sulfur in a liquid or gas phase, with the associated benefit of the low temperature being beneficial for achieving very high conversion of $SO_2$ and $H_2S$ into elemental sulfur, both due to the low temperature but also since the reaction product is removed, providing even better conditions for high conversion.

In a further embodiment said material catalytically active in conversion of $SO_2$ to $SO_3$ comprises vanadium, with the associated benefit of such a material providing an efficient process for production of sulfuric acid.

In a further embodiment said step (h) for $SO_2$ oxidation to $SO_3$ is carried out under a pressure of 50 mbar g to 200 mbar g, a temperature of 370° C. to 530° C. and a space velocity of 800 Nm³/h/m³ to 1500 Nm³/h/m³, per catalyst bed, with the associated benefit of such conditions being efficient for the oxidation of $SO_2$ to form $SO_3$.

In a further embodiment the amount of sulfur in the stream of sulfuric acid is higher than 1%, 3% or 5% and less than 17%, 21% or 25% of the total amount of elemental sulfur withdrawn from the process. A recycle above the lower limits has the benefit of providing the effect of reduced process gas volume, while the recycle being less than the upper limits avoids a situation where additional fuel must be added to the Claus reaction furnace, resulting in extra process volume and operational cost.

In a further embodiment the sulfuric acid in the stream of sulfuric acid is atomized in said Claus reaction furnace using pneumatic nozzles (driven by compressed air or another pressurized gas, such as steam or nitrogen) or hydraulic nozzles (also known as pressure nozzles) and wherein the residence time in the Claus reaction furnace is at least 0.5 seconds, 1 second or 1.5 seconds, with the associated benefit of such residence times being sufficient for complete evaporation of sulfuric acid droplets.

In a further embodiment the molar ratio $H_2S:O_2$ of the components directed to the Claus reaction furnace is at least 2.5, with the associated benefit of such a low oxygen feed enabling sub-stoichiometric partial conversion of $H_2S$ to $SO_2$, from the contribution from thermal dissociation of $H_2SO_4$, adding the remaining $O_2$ to obtain the desired $H_2S:SO_2$ ratio of 2.0 in the Claus converter feed gas.

In a further embodiment an amount of gas in the process is cooled and directed to an upstream position for controlling the process temperature, with the associated benefit of enabling active control of the temperature of the highly exothermic processes.

In a further embodiment one or more streams directed to said Claus reaction furnace are pre-heated by heat exchange with a hot process stream, with the associated benefit of minimizing or avoiding the requirements for support fuel to achieve the desired temperature for evaporation of sulfuric acid and conversion of the feedstocks.

In a further embodiment one or more streams directed to said Claus tail gas combustor are pre-heated by heat exchange with a hot process stream with the associated benefit of minimizing or avoiding the requirements for support fuel to achieve the desired temperature for combustion and subsequent oxidation of $SO_2$.

In a further embodiment at least one of said catalytically active materials for oxidation of $SO_2$ to $SO_3$ or $H_2S$ to elemental sulfur and/or at least one product withdrawn from one of said catalytically active materials are cooled by heat exchange, such as interbed heat exchange or an internally cooled catalytic reactor, with the associated benefit of enabling active control of the temperature of the highly exothermic processes by interbed heat exchange or an internally cooled catalytic reactor such as a boiling water reactor, having a tubular or a thermoplate cooling circuit.

A further aspect of the present invention relates to a process plant comprising a Claus reaction furnace, a Claus waste heat boiler, a Claus conversion section, a Claus tail gas combustor and a sulfuric acid section, wherein the Claus reaction furnace has a furnace inlet, an acid nozzle inlet and an outlet, the Claus waste heat boiler has a gas inlet, a gas outlet and optional an elemental sulfur outlet, the Claus conversion section has a gas inlet, a gas outlet and an elemental sulfur outlet, the Claus tail gas combustor has an inlet and an outlet and the sulfuric acid section has a gas inlet, a gas outlet and a sulfuric acid outlet, and wherein the inlet of the Claus reaction furnace is configured for receiving a feedstock gas, fuel and an oxidant, and the outlet of the Claus reaction furnace is configured for being in fluid communication with the inlet of the Claus waste heat boiler, wherein the outlet the Claus waste heat boiler is configured for being in fluid communication with the inlet of the Claus conversion section and wherein the inlet of the Claus tail gas combustor is configured for being in fluid communication with the outlet of said Claus conversion section gas outlet, the Claus tail gas combustor outlet is configured for being in fluid communication with the inlet of the sulfuric acid section, characterized further in the sulfuric acid outlet of the sulfuric acid section being in fluid communication with the acid nozzle inlet of said Claus reaction furnace, with the associated benefit of such a process avoiding undesired production of sulfuric acid, as well as reducing the process gas volume.

In a further embodiment the process plant, further comprises a sulfur storage tank having a volume corresponding to the amount of sulfuric acid withdrawn from the sulfuric acid outlet of the sulfuric acid section in from 1 day to 4 days, with the associated benefit of decoupling the operation of the Claus process and the sulfuric acid process providing a stabilized operation of the process plant.

The present invention describes a combination of a Claus process and a sulfuric acid process, which effectively can produce the amount of sulfuric acid required by a process plant or even avoid production of sulfuric acid and convert excess sulfuric acid to elemental sulfur which may be transported to other sites.

For maximum conversion to elemental sulfur ⅓ of the $H_2S$ must be converted to $SO_2$.

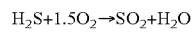

$$H_2S + 1.5 O_2 \rightarrow SO_2 + H_2O \quad (1)$$

The stoichiometric ratio between $H_2S$ and $SO_2$ is controlled by controlling the amount of oxygen in the Claus reaction furnace. Oxygen is typically supplied by atmospheric air, but can also be $O_2$ enriched air or even pure $O_2$.

The oxygen addition to the Claus reaction furnace must also take into account the amounts of $NH_3$, CO, $H_2$ and hydrocarbons in the feed streams.

If the combustion temperature in the Claus reaction furnace is less than 1100° C. the conversion of e.g. $NH_3$ may be incomplete. The consequence of this will be a Claus converter feed gas having a potential for formation of ammonia salts, such as $(NH_4)_2SO_4$ and $(NH_4)_2S_2O_3$ which may plug the Claus condenser.

The partially oxidized Claus converter feed gas is then converted to elemental sulfur by the following reactions at a temperature typically above 200° C. in the presence of a catalytically active material, such as activated aluminum(III) oxide or titanium(IV) oxide.

$$2H_2S+SO_2 \rightarrow \tfrac{3}{8}S_8+2H_2O \qquad (2)$$

Often 3-4 Claus converters are operated in series, to increase the conversion to a maximum, which will increase the cost of a Claus plant.

The control of temperature in the Claus process is important to ensure that elemental sulfur formed in catalytic converter remains gaseous, such that it is condensed in the desired process position only. A further restriction is related to the fact that, as the Claus process is exothermic, it is beneficial to operate at low temperatures.

An alternative to the above process is the so-called sub-dewpoint Claus process, in which the material catalytically active operates at temperatures where elemental sulfur is not on the gas phase. Such a sub-dewpoint Claus process will require an appropriate scheme for withdrawal of condensed sulfur, e.g. by pulsing of the temperature and purging of elementary sulfur by an inert gas.

Even with 3-4 Claus converters/condensers/reheaters in series it is not possible to reach more than ~98% sulfur recovery, which is insufficient to comply with most environmental legislations. Therefore, the Claus plant is typically equipped with a so-called Claus tail gas plant, where the above mentioned sub-dewpoint process is one example. Numerous tail gas processes exist, having different features. To achieve very high removal efficiencies these Claus tail gas plants become complicated and approach the same cost as the Claus plant itself.

The produced elemental sulfur, does typically not have a direct use in the plants producing the $H_2S$ containing waste stream, but elemental sulfur is simple to transport to other sites and to store for prolonged periods.

A common alternative to the Claus process is the conversion of $H_2S$ to sulfuric acid, e.g. by the so-called wet sulfuric acid process. The sulfuric acid produced may be used in other chemical processes in the plant. A wet sulfuric acid process may also constitute the tail gas cleaning of a Claus process plant. A similar dry sulfuric acid process may also find use in this relation.

The sulfuric acid processes oxidize $H_2S$ to $SO_2$ typically in a Claus tail gas combustor and the $SO_2$ into $SO_3$ and subsequently hydrate $SO_3$ into sulfuric acid, either by reaction with water in the gas phase in the so-called wet sulfuric acid process or by absorption in concentrated sulfuric acid in the so-called contact process or dry process. The reaction temperature during oxidation of $SO_2$ to $SO_3$ will be in the range 370-530° C., in the presence of a catalytically active material, typically comprising vanadium. Typically, the wet sulfuric acid processes produce sulfuric acid having a concentration in the range 92%-98%, whereas dry sulfuric acid processes may also produce sulfuric acid having a concentration in excess of 98%.

In addition, it may also be attractive to collect high pressure steam in the range from 30 barg to 80 barg from the highly exothermic sulfuric acid processes, whereas the Claus process will only provide steam of lower pressure.

Production of large amounts of sulfuric acid may, however, be less attractive, even though sulfuric acid is traded commercially, as transport of sulfuric acid is complex and regulated.

The reactions taking place in a sulfuric acid process (dry and wet) are $$H_2S+1.5O_2 \rightarrow SO_2+H_2O \qquad (3)$$

$$SO_2+0.5O_2 \rightarrow SO_3 \qquad (4)$$

$$SO_3+H_2O \rightarrow H_2SO_4 \qquad (5)$$

The overall reaction of the sulfuric acid process can be described according to $$H_2S+2O_2 \rightarrow H_2SO_4 \qquad (6)$$

The wet sulfuric acid process as an ordinary Claus tail gas solution provides a solution that fulfills the environmental regulations at both lower capital and operating cost than the alternatives. The only disadvantage of the wet sulfuric acid process, so far, has been the sulfuric acid product that is not always desirable.

It has now been realized that the integration of the Claus process and sulfuric acid process may also be carried out by recycle of all or substantially all produced sulfuric acid to the Claus reaction furnace. With the new invention, an integrated Claus/wet sulfuric acid process will remove the disadvantage of an inconvenient sulfuric acid product, and at the same time reduce plant size of both the Claus and wet sulfuric acid process.

Combustion of sulfuric acid is known from regeneration of spent sulfuric acid in a wet sulfuric acid plant, but has not been practiced in the reaction furnace of the Claus process or under Claus process conditions.

Although there are similarities in injecting sulfuric acid into a wet sulfuric acid plant and a Claus plant, the purpose and conditions differ significantly. In the wet sulfuric acid plant, the primary purpose of the spent sulfuric acid injection is to burn tar compounds present in the acid, whereas the fate of $H_2SO_4$ and $SO_3$ is not important as the downstream process will convert the sulfur compounds into $H_2SO_4$, which is the final product.

In the Claus process, the sulfuric acid from the downstream sulfuric acid plant is tar free and the aim of the recycle acid injection is to ensure that $H_2SO_4$ and $SO_3$ destruction is complete before the process gas leaves the reaction furnace, such that elemental sulfur is the only product. $H_2SO_4/SO_3$ leaving the reaction furnace can cause catalyst deactivation and/or sulfuric acid condensation and corrosion of process equipment.

In the sulfuric acid process for spent acid regeneration, the atmosphere is oxidative and the spent sulfuric acid typically comprises more than 80% of the total sulfur input, whereas the Claus reaction furnace according to the present disclosure operates with a reducing atmosphere and the sulfuric acid flow is typically <10% of the total sulfur feed, although up to 25% is possible under special circumstances. A further difference lies in the fact that the partial oxidation of $H_2S$ is an exothermal process providing heat, whereas incineration of sulfuric acid in spent acid regeneration is an endothermal process requiring a support fuel.

The residence time in a spent acid regeneration furnace is typically 2-5 seconds to ensure complete destruction of the tar compounds, whereas the Claus plant reaction furnace is typically designed for 1-2 seconds of residence time to ensure destruction of gaseous hydrocarbon and $NH_3$ present in the feed gas.

When the sulfuric acid is injected into the Claus reaction furnace the following overall reaction takes place $$H_2SO_4+3H_2S \rightarrow 2S_2+4H_2O \tag{7}$$

To complete this overall reaction, the following reactions have to be completed:

$$H_2SO_4 \text{ (liquid)} \rightarrow H_2SO_4 \text{ (gas)} \tag{8}$$

$$H_2SO_4 \text{ (gas)} \rightarrow H_2O \text{ (gas)} + SO_3 \text{ (gas)} \tag{9}$$

$$SO_3 \text{ (gas)} \rightarrow SO_2 \text{ (gas)} + 0.5O_2 \text{ (gas)} \tag{10}$$

Reaction (8) is a common evaporation reaction, in which energy required for heating up the liquid and evaporating water and sulfuric acid is supplied by the hot surrounding process gas. An effect of full evaporation of sulfuric acid is that gaseous $H_2SO_4$ is far less corrosive than liquid $H_2SO_4$ droplets and gaseous $H_2SO_4$ is far more reactive.

Reaction (9) is an endothermal dissociation reaction, which occurs almost instantaneously at temperatures above 600° C. At this point some $SO_3$ will start reacting with $H_2S$ to form $SO_2$, $H_2O$ and sulfur.

Reaction (10) is an endothermal decomposition reaction, which is rapid at temperatures above 900° C. In oxygen rich atmospheres, chemical equilibrium prevents complete dissociation, but in reducing atmospheres, the removal of the $O_2$ product (by reaction with $H_2S$) will allow for complete decomposition. The reaction between $H_2S$ and $O_2$ is very fast at these elevated temperatures. The S-atom in $SO_3$ formed by reaction 9 is in oxidation state +6 and is a highly reactive oxidation agent which is able to oxidize not only $H_2S$ but also hydrocarbons (including BTX=Benzene, Toluene and Xylene) and $NH_3$. Hydrocarbons and $NH_3$ are typically present in the feed streams and it is important that these compounds are destroyed in the reaction furnace as they can cause catalyst deactivation, fouling and plugging in the downstream catalytic Claus conversion stages and sulfur condensers.

Compared to $NH_3$ and hydrocarbons, $H_2S$ has the highest affinity for $O_2$ and as the $O_2$ supply is substoichiometric, there will be no $O_2$ left for the oxidation of hydrocarbons and $NH_3$ according to the normal oxidation reactions 11 and 12:

$$CH_4+2O_2 \rightarrow CO_2+2H_2O \tag{11}$$

$$2NH_3+1.5O_2 \rightarrow N_2+3H_2O \tag{12}$$

Reaction 11 represent all hydrocarbon species as they in principle follow the same overall oxidation mechanisms, i.e. the C and H become $CO_2$ and $H_2O$.

In the absence of free $O_2$, the general perception is that $SO_2$ plays an important role in the oxidation as the S-atom in $SO_2$ is in oxidation state +4 and is thus a strong oxidation agent. As described in Sulphur magazine no 375, March-April issue 2018, ("Combustion challenges in the reaction furnace"), the following overall reactions are responsible for the oxidation of $CH_4$: (the reactions are scaled for easier overview)

$$3CH_4+6S_2 \rightarrow 3CS_2+6H_2S \tag{13}$$

$$3CS_2+3SO_2 \rightarrow 3CO_2+4.5S_2 \tag{14}$$

$$2H_2S+SO_2 \rightarrow 2H_2O+1.5S_2 \tag{15}$$

$$4H_2S+6O_2 \rightarrow 4SO_2+4H_2O \tag{16}$$

Summing reactions 13-16, the overall reaction becomes $$3CH_4+6O_2 \rightarrow 3CO_2+6H_2O \tag{17}$$

which is similar to reaction 1, which represents the oxidation of $CH_4$ with free $O_2$.

Reaction 14 is the reaction in which $SO_2$ oxidizes the S-atoms in $CS_2$ from oxidation state −2 to +0 in $S_2$ while the S-atom in $SO_2$ is reduced from oxidation state +4 to 0.

Reaction 15 is the normal Claus reaction already taking place and reaction 16 is the very fast oxidation of $H_2S$ by free $O_2$. Reactions 13 and 14 will thus determine the extent and rate of hydrocarbon destruction.

As $SO_3$ is absent from a regular Claus reaction furnace, the analysis above has not considered the presence of this species. Since the S-atom in $SO_3$ is in oxidation state +6, the oxidation power is stronger than for $SO_2$ and thus the oxidation of the S-atoms in the $CS_2$ molecule is expected to take place at a faster rate at the same temperature or at the same rate, but at a lower temperature.

The overall reaction between $SO_3$ and $CS_2$ is assumed to be:

$$2CS_2+2SO_3 \rightarrow 2CO_2+SO_2+2.5S_2 \tag{18}$$

A rule of thumb from traditional Claus processes is that at least 1,000-1,050° C. is required in the Claus reaction furnace is order to completely oxidize the hydrocarbons within the 1-2 seconds residence time, but with the presence of $SO_3$ it is expected that the hydrocarbons can be oxidized already at 900° C.

For destruction of $NH_3$, the normal oxidation reaction is described in reaction 12, but as the reaction furnace has no free $O_2$, $SO_2$ plays an important role as oxidizing agent. The $O_2$ free oxidation of $NH_3$ also involves the oxidation capabilities of $SO_2$ as described in reaction 19:

$$2NH_3+SO_2 \rightarrow N_2+H_2S+2H_2O \tag{19}$$

$$H_2S+1.5O_2 \rightarrow SO_2+H_2O \tag{20}$$

Summing reaction 19 and 20, the overall reaction becomes:

$$2NH_3+1.5O_2 \rightarrow N_2+3H_2O \tag{21}$$

Reaction 20 is the very fast $H_2S$ oxidation by free $O_2$ and thus the $NH_3$ destruction is limited by the overall reaction rate of reaction 19.

Similar to the destruction of hydrocarbons, the S-atom in $SO_3$ is in oxidation state +6 while the S-atom in $SO_2$ is in the oxidation state +4 and thus $SO_3$ is a stronger oxidation agent. The $NH_3$ destruction is expected to proceed at a faster rate in the presence of $SO_3$, either allowing the reaction to complete with a lower residence time at unchanged temperature in the reaction furnace or at a lower temperature with the same residence time.

The overall reaction of $NH_3$ destruction by $SO_3$ is assumed to be:

$$2NH_3+SO_3 \rightarrow N_2+3H_2O+0.5S_2 \tag{22}$$

A rule of thumb is that a reaction furnace temperature of 1,200-1,250° C. is required to ensure complete $NH_3$ destruction in 1-2 seconds. The presence of $SO_3$ as oxidizing agent may in analogy to hydrocarbon oxidation be able to lower this reaction temperature by 50-200° C.

As the residence time in a Claus reaction furnace is typically 1-2 seconds, it must be assured that the reactions 8, 9, 10 and 1 as well as the destructions of impurities are completed within this time and that reaction 2 has reached chemical equilibrium. When the process gas is cooled, the reaction rates dramatically decrease and further conversion in the gas phase will be insignificant.

Presence of $O_2$ and/or $SO_3$ in the process gas contacting the catalyst in the downstream Claus reactors will lead to deactivation of the catalyst due to "sulfation" reaction, where catalytically active aluminum oxide or titanium oxide is converted catalytically inactive aluminum sulfate or titanium sulfate and thus sulfur formation in these reactors will decrease, leading to an increase in unconverted sulfur species to the downstream tail gas sulfuric acid plant and increased emissions to the atmosphere.

Furthermore, $SO_3$ in the process gas can, during passage through the sulfur condensation units, combine with water and condense and form sulfuric acid in the elemental sulfur product, which can lead to corrosion of process equipment an undesired contamination of the sulfur product Whereas reactions 9 and 10 can be considered very fast, the rate determining step can be reaction 8, i.e. the evaporation of the sulfuric acid. It is evident that liquid sulfuric acid with a maximum boiling temperature of ~340° C. cannot exist at equilibrium in a 1,000° C. reaction furnace, but the evaporation rate is limited by heat and mass transfer between the liquid surface and the process gas, and therefore temporary existence of sulfuric acid droplets is possible. Detailed mathematical analysis of droplet evaporation, including convective heat and mass transfer, radiative heat transfer and sulfuric acid thermodynamics show that the time for complete droplet evaporation depends on the temperature and the square of the initial droplet diameter.

The time for complete evaporation can be as low as 0.2 seconds for a droplet with an initial diameter of 200 μm and as high as 2 seconds for a droplet with an initial diameter of 700 μm. Thus in order to ensure that all droplets are evaporated and reacted in the reaction furnace, the droplet size distribution from the sulfuric acid injection nozzle(s) is important.

The choice of sulfuric acid atomization nozzle is thus an important factor in achieving a successful operation of the Claus plant—many types of atomization nozzles exist, where some will be able to provide the small sulfuric acid droplets and some will not.

So-called pneumatic nozzles (also known as air assisted or two-fluid nozzles) typically provide the smallest droplets. These nozzles use kinetic energy to atomize the sulfuric acid into sufficiently small droplets and thus compressed air is mixed with the liquid at the nozzle tip. Low pressure steam, oxygen, $N_2$ and other gaseous fluids can be used instead of the air. By proper selection of the nozzle size and operating pressures, these nozzles will provide a size distribution suitable for fast droplet evaporation.

Hydraulic atomization nozzles use the pressure of the liquid (i.e. sulfuric acid) to provide the energy for atomizing the liquid and by proper choice of pressure and nozzle design, these nozzles will also be able to produce small droplets. Generally, the droplet size decrease with increasing pressure, decreasing flow and increasing atomization angle. The benefit of the hydraulic nozzle is a lower operating cost as there is no consumption of compressed air. However, the capacity and turn-down ratio for these nozzles are not as good as for the air assisted nozzles.

The characteristics of atomizing nozzles are usually measured with water as the liquid and air as the atomizing media (for air assisted nozzles only). The droplet size distribution is measured and characterized by one-dimensional parameters, such as VMD, SMD, $DV_{0.9}$ etc. The relevance of the characteristics depends on the application.

VMD is the Volume Mean Diameter, which means that 50% of the volume/mass of droplets are larger than the given diameter SMD is the so-called Sauter mean diameter is defined as the diameter, which has the same volume to surface ratio as the total volume of droplets to the total surface area of the droplets $D_{0.9}$ is the diameter for which 90% of the total volume/mass of the droplets are smaller $D_{max}$ is the maximum diameter found in the size distribution For evaporation purposes, the $D_{0.9}$ and $D_{max}$ values are the most relevant size characteristic parameters for the nozzle.

These values, however, does not reveal complete information on the size distribution, where especially the distribution of the largest droplets are of importance for this invention.

The actual droplet sizes for a liquid with other properties than water at room temperature, can be only vaguely estimated by liquid properties such as viscosity, surface tension and density. The density has negligible effect on the droplet size, whereas an increase in viscosity and surface tension leads to larger droplets. Sulfuric acid has higher viscosity and lower surface tension compared to water and the extent to which the complex interactions of the two opposite effects cancel each other must be determined experimentally or by detailed modelling.

After some time in operation, the nozzles will eventually become worn, due to erosion by the acid and/or air (with particles) and due to corrosion by the sulfuric acid. Worn nozzles will produce less uniform spray patterns and the size distribution will shift towards larger droplets and therefore it is important to ensure that the nozzles are in good conditions, e.g. by visual inspections or by monitoring of liquid and, in the case of pneumatic nozzles, gas pressure drops over the nozzles. With proper design of the acid injection system, it will be furthermore be possible to isolate the acid injection lances and withdraw them from the reaction furnace while keeping the Claus plant in operation.

With proper choice and operation of the sulfuric acid atomization nozzles, complete evaporation of the droplets and complete conversion of $SO_3$ and $O_2$ can be achieved in less than 1-2 seconds, which is the normal residence time for a Claus reaction furnace.

However, there are different means to ensure that large droplets formed at the nozzle tip will not lead to excessive amounts of droplets and $H_2SO_4/SO_3$ leaving the reaction furnace.

One design choice is to provide a large reaction furnace chamber, such that the residence time of the process gas is high, but this may be costly.

The turbulence in the reaction furnace chamber may be increased, by hindering or redirecting the flow, e.g. by using choke rings, vector walls, tangential inlets etc. which will provide a more narrow residence time distribution for the droplets, reducing the likelihood of a droplet experiencing a much lower than average residence time.

Similarly the presence of a means of impaction such as an impaction wall, a checker wall or a packed volume or compartment of inert material, can reduce the amount of large droplets, which, due to their high inertia, will not be able to follow the stream lines of the gas which is diverted close to the obstruction. Instead the large droplets will continue onwards and collide with the obstruction and evaporate from the obstruction surface. Such a means of impaction is typically quite robust and is not a supporting structure, to avoid stability problems due to the wear of the material of construction.

To avoid sulfation of Claus catalysts, a material catalytically active in conversion of $SO_3$ to $SO_2$ comprising e.g. one or more compounds of V, Mn, Fe, Co, Cu, Zn, Ni, Mo, W, Sb, Ti and Bi supported on one or more compounds of Al, Ti, Si, diatomaceous earth, Zr, Mg, and cordierite may also be positioned downstream the Claus reaction furnace. Such a material may be in the form of catalyst pellets or structured catalysts such as monoliths.

If all sulfuric acid produced in the sulfuric acid process downstream the Claus process is directed to the Claus reaction furnace, it is possible to operate a Claus process in which the $H_2S$ abatement employs the very high removal efficiency as well as thermal efficiency of the sulfuric acid plant, but in which the only product is sulfur, which is simple to handle and transport.

In addition, by the recycle of sulfuric acid, $O_2$ is released by the decomposition of $H_2SO_4$, such that the amount of added combustion oxidant will be reduced, which, if the oxidant is atmospheric air, has the benefit of reducing the process volume dramatically, since atmospheric air comprises close to 80% inert $N_2$, i.e. 4 volumes of $N_2$ per volume of $O_2$.

The overall Claus reaction, based on air as $O_2$ carrier to the Claus reaction furnace is:

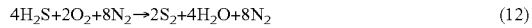

$$4H_2S+2O_2+8N_2 \rightarrow 2S_2+4H_2O+8N_2 \quad (12)$$

Similarly, the overall Claus reaction, based on $H_2SO_4$ as the $O_2$ carrier to the Claus reaction furnace is:

$$3H_2S+H_2SO_4 \rightarrow 2S_2+4H_2O \quad (13)$$

Comparing the two reactions, it is evident that $H_2SO_4$ is an excellent $O_2$ carrier and has the (theoretical) potential to reduce the Claus tail gas volume flow by 67% compared to atmospheric air.

It may also be beneficial to by-pass an amount of feedstock gas to the Claus tail gas combustor, since the feedstock gas has a calorific value, which may be used in the Claus tail gas combustor, and thus reduce the requirement for addition of support fuel. This may be even more beneficial if two sources of feedstock gas exist, such that one feedstock gas free of $NH_3$ and another feedstock gas containing $NH_3$, since the substoichiometric conditions in the Claus reaction furnace hinders complete oxidation of $NH_3$. So-called Sour Water Stripper (SWS) gases is an example of such an $NH_3$ containing feed stock gas.

In Claus processes for treatment of SWS gas, the complete destruction of $NH_3$ in the Claus reaction furnace is crucial, otherwise ammonia salts such as $(NH_4)_2SO_4$ and $(NH_4)_2S_2O_3$ will form and plug the final sulfur condenser. Special high intensity (two-stage) burners are able to reach the high temperatures needed for thermal $NH_3$ destruction, but require accurate control of oxygen in two separate streams.

However, it is well known to treat SWS gas in a sulfuric acid plant, since complete oxidation of $NH_3$ to $N_2$ and NO is obtained with excess oxygen at temperatures above 1000° C. Therefore, it may be desirable to configure an integrated Claus/sulfuric acid process with two combustors for directing a first feedstock comprising $H_2S$ and little or no $NH_3$ to the Claus reaction furnace while directing a gas comprising $NH_3$, such as SWS gas, to the Claus tail gas combustor. In such a configuration it may be desirable to design the sulfuric acid plant to include a section for selective catalytic reduction (SCR) of NO, by $NH_3$ in the presence of a vanadium based catalyst.

The integrated process according to the present disclosure may also benefit from the use of oxygen enriched air or substantially pure oxygen in the Claus reaction furnace. The use of oxygen enriched air has the benefit of reducing the amount of inert nitrogen in the process gas, and thus reducing the process gas volume and thus reduce plant size. The absence of dilution by nitrogen also has the effect of increasing the combustion temperature, which may be beneficial if impurities are present which need complete conversion, especially since the amount of oxygen in the Claus reaction furnace is sub-stoichiometric. Since the Claus catalyst is sensitive to presence of impurities, such as light hydrocarbons it may often be beneficial to operate the Claus reaction furnace with oxygen enriched air to achieve an elevated temperature for complete oxidation of impurities. This also has the further benefit of enabling an initial homogeneous non-catalytic Claus conversion, which may take place at temperatures above 900° C.

From a thermal efficiency perspective, the high combustion temperature may however be limited by the choices of construction materials in the Claus reaction furnace and downstream waste heat boiler. For highly concentrated $H_2S$ feed gases, oxygen enrichment may increase the process gas temperature above the design temperatures for the materials. A combination of $H_2SO_4$ recycle (which cools the process gas by evaporation and acid decomposition) will however make use of enriched $O_2$ in such a layout possible.

The Claus tail gas combustor will typically be operated with atmospheric air, and in addition it may also be beneficial to direct gases with a low concentration of sulfur species to the Claus tail gas combustor as complete combustion of the sulfur species release considerably more energy than the partial oxidation taking place in the Claus reaction furnace.

As a consequence, it may be beneficial to direct feedstock gases comprising high concentrations (e.g. more than 50 vol %) of $H_2S$ to the Claus plant, while by-passing the less concentrated feedstock gases as well as feedstock gases comprising $NH_3$ to the Claus tail gas combustor.

If the Claus tail gas combustor only receives a Claus tail gas comprising only a limited amount of $H_2S$, the calorific value is too low to maintain a stable combustion. In that situation addition of a support fuel is required. This support fuel may either be $H_2S$, SWS gas or a hydrocarbon feed, but preferably an amount of an existing feedstock gas to the integrated Claus and sulfuric acid plant is used.

The integration between the Claus process and the sulfuric acid process allows for integration benefits. These include the possibility to reduce the volumetric flow in the Claus process, by providing oxidant in the form of sulfuric acid, which can replace atmospheric air. In addition, the use of feedstock gas may be optimized such that feedstock gases comprising fuels contributing highly to sulfur production may be directed to the Claus process, whereas feedstock gases contributing with thermal energy and non-reacting products such as $CO_2$ may be directed to the sulfuric acid process. Where the process is designed for recycle of a too high amount of sulfuric acid, additional fuel may be required for providing the heat required for evaporation and dissociation of sulfuric acid.

The integration of the two processes also enable a process where the operation of the Claus process is carried out with a low conversion such as 90% or 95%—since it may be cheaper to carry out the additional conversion in a sulfuric acid process compared to the addition of an extra Claus converter stage.

In the integrated process, in which the sulfuric acid from the sulfuric acid process is recycled to the thermal stage of the Claus plant, an intermediate sulfuric acid storage tank may beneficially be located between the sulfuric acid outlet in the sulfuric acid plant and the sulfuric acid inlet to the Claus reaction furnace. Such a tank will allow for a more robust and safe control of the acid injection into the Claus reaction furnace, such that off-set periods can be operated without acid injection. For instance, during start-up and shut-down of the integrated process, it will be advantageous to operate without sulfuric acid injection. Also if the acid injection lances require service, the integrated process can be operated without shutting down the sulfuric acid process.

The tank will also enable withdrawing sulfuric acid product, should this become a desired product and also allow import of sulfuric acid from other sources. The tank may also act as a buffer, decoupling operation of the Claus process from operation of the sulfuric acid process, which provides stability of the overall system A tank capacity for 1-4 days of sulfuric acid production is a good compromise between tank cost and flexibility of the integrated Claus process and sulfuric acid process.

For robust operation of an industrial plant, a "trip system" for detecting and handling unexpected shut-downs ("trips") is common. For an integrated Claus process and sulfuric acid process, a trip may occur in either of the two processes, and it is important that the process is robust against such trips, such that the consequences are minimized.

It can be necessary to stop the sulfuric acid injection into the Claus reaction furnace, e.g. due to a failure of the acid pump at the sulfuric acid tank, failure of the flow controller of the sulfuric acid and loss of atomization fluid. In such a situation, the trip system of the Claus plant must be updated to handle such incidents, allowing trip of the acid injection nozzles while keeping the Claus plant in operation. In case of a stop in the acid injection, the combustion air control system of the Claus reaction furnace will compensate for the lack of oxygen by increasing the air flow, thereby bringing the Claus plant back to normal operation.

During operation, the sulfuric acid atomization lances and nozzles are cooled by the flow of atomization air and especially by the flow of the sulfuric acid. With a stop of acid flow, the majority of the cooling disappears and the temperature of the lance will increase. The lance material will be able to withstand the operating temperature of the reaction furnace, but any acid trapped in the lance will become hot. Corrosion rates will increase significantly and boiling of the sulfuric acid may take place too. To avoid this situation, the acid lines may be flushed with a gaseous flushing media to remove liquid acid from the lances, such that acid corrosion will be minimized while the lance will be provided with some extra cooling and ingress of Claus reaction furnace process gas into the lance is avoided. The flushing will continue as long as the acid flow is stopped. The flushing media will typically be a stream of $N_2$ which is already available and used in Claus plants and is an inert gas that will not interfere with the chemistry in the reaction furnace. As an alternative, air can be used as flushing media, but then also $O_2$ will be added to the Claus reaction furnace and there is a risk of interfering with the combustion air control if the flushing stream is not equipped with a flow instrument. Stop of sulfuric acid injection will also result in a temperature increase in the reaction furnace, but the temperature increase will in most circumstances not be problematic as the refractory walls will be able to withstand the higher temperature and a higher temperature will not have a bad impact of the Claus reaction furnace chemistry.

In the event of an acid injection trip, the atomization media of pneumatic nozzles will continue flowing, such that the lance is cooled and process gas ingress to the lance is avoided. Following a trip of the acid flow, stagnant acid will remain in the acid line in the lance and without the cooling provided by the flow of acid, the acid temperature will increase and thus the corrosion rate of the acid will increase too. To avoid corrosion of the acid line after a trip of acid flow, the acid line is flushed with $N_2$ or air to clean the line from acid. This flushing will be carried out for both pneumatic and hydraulic nozzles and will continue as long as desired to avoid ingress of process gas into the nozzles.

In addition to the wet sulfuric acid process, sulfuric acid can also be produced in other sulfur abatement processes, and this sulfuric acid may also be directed to a Claus reaction furnace by similar principles, especially if the sulfuric acid produced is at least 90%.

A standard Claus plant layout requires >50 vol % $H_2S$ in the feed gas to be thermally self-sustainable in the Claus reaction furnace. With lower $H_2S$ concentrations, feed gas preheating and so-called split flow configuration is required. Claus plants treating feed gases with <10-20 vol % $H_2S$ are rarely seen. Sulfuric acid processes, on the other hand, very efficiently treat these so-called lean $H_2S$ gases, producing concentrated sulfuric acid. The sulfuric acid product will be highly concentrated in sulfur and oxygen.

A combination of a sulfuric acid plant to treat a lean $H_2S$ (and/or other sulfur compounds) gas in combination with a Claus plant treating a rich $H_2S$ gas and accepting the acid from the sulfuric acid plant will be a beneficial setup as the feed streams to both the Claus plant and sulfuric acid plant are optimal with regard to conversion efficiency, thermal efficiency and plant size/cost.

The coupling between the Claus process and a sulfuric acid process may also be used to optimize the treating of feeds. Sulfuric acid processes and in particular the wet sulfuric acid process has the benefit of being well suited for contaminated feeds, including SWS gases comprising ammonia as discussed above, "dirty sulfur" comprising organic impurities and moderate amounts of inorganic impurities, dilute streams of $H_2S$, $SO_2$ and other sulfur compounds, including flue gases from burners and FCC gas. Similarly, rich $H_2S$ gases, which must be diluted before being treated in a wet sulfuric acid plant, may instead be directed immediately for the Claus process.

FIGURES

Figure 2:
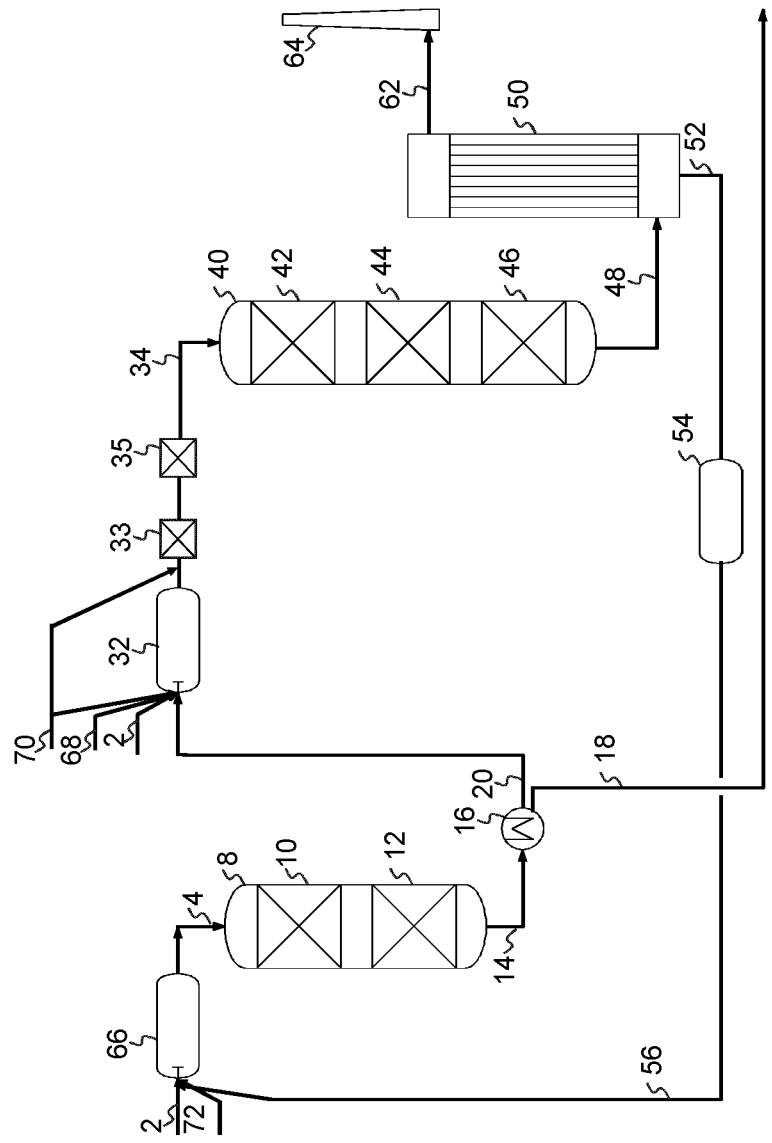
Figure 3:
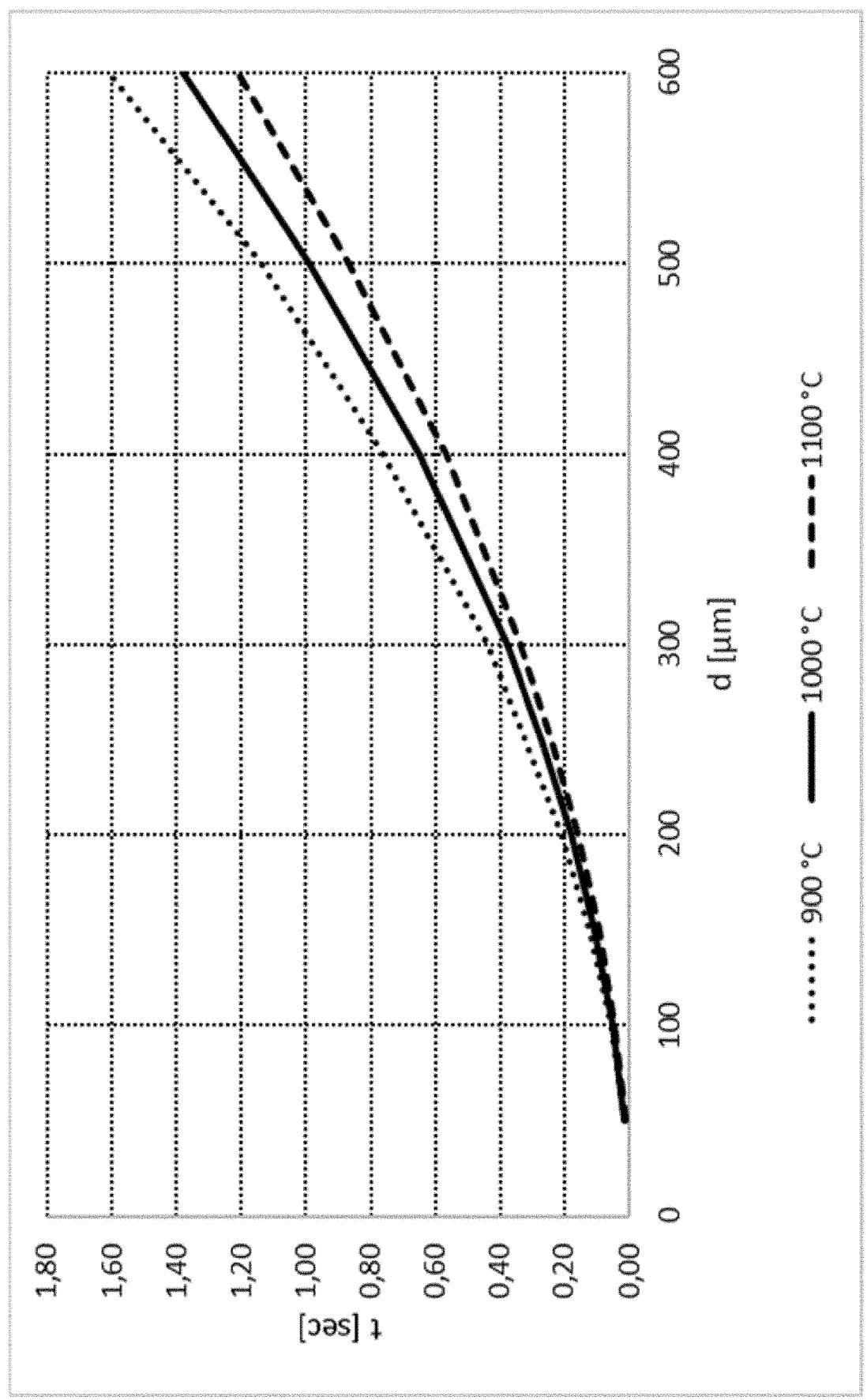

FIG. 1 shows a sequential Claus+ sulfuric acid process according to the prior art FIG. 2 shows an integrated Claus+ sulfuric acid process with injection of sulfuric acid in the Claus reaction furnace according to the present disclosure FIG. 3 shows the results of simulations for three different reaction furnace temperatures.

In FIG. 1 a process for production of sulfur and sulfuric acid according to the prior art is shown. Here a feedstock gas 2 rich in $H_2S$ is directed to a Claus process, from which the tail gas 26 is directed to a sulfuric acid process. The feedstock gas 2 rich in $H_2S$ is directed to a Claus reaction furnace 66 converting an amount of the of $H_2S$ to $SO_2$, to form a Claus converter feed gas 4 having a ratio between $H_2S$ and $SO_2$ close to 2:1. The Claus converter feed gas 4 is directed to a converter 8 containing a material catalytically active in the Claus reaction 12, providing a Claus process product 14. The Claus process product 14 is directed to a sulfur condensation unit 16, providing condensed sulfur 18 and a Claus tail gas 20. The wet Claus tail gas 20 is typically further reacted in the presence of additional material catalytically active in the Claus reaction followed by further condensation of sulfur, in one to four further Claus stages (not shown here), to provide a final wet Claus tail gas. An aqueous phase 24 may optionally be separated from the wet Claus tail gas 20 in a separator 22, providing a dried Claus tail gas 26, which is directed to a Claus tail gas combustor 32, providing a $SO_2$ converter feed gas 34. The $SO_2$ converter feed gas 34 is cooled and directed to an $SO_2$ converter 40, containing one or more beds (layers) of catalytically active material 42, 44, 46 optionally with interbed cooling, from which an $SO_3$ rich gas 48 is withdrawn. As the $SO_3$ rich gas contains water, the $SO_3$ may hydrate to form $H_2SO_4$. $H_2SO_4$ is condensed as concentrated sulfuric acid 52 in a sulfuric acid condenser 50. From the sulfuric acid condenser 50 a substantially pure gas 62 may be withdrawn and directed to stack 64.

In order to maintain a stable flame and sufficient high temperature for complete oxidation of $H_2S$, CO, $CS_2$, COS and $H_2$, fuel gas may be directed to the Claus tail gas combustor 32. Oxygen is also supplied, typically via air and preferably hot air from the sulfuric acid condenser (50), in order to supply oxygen for both the combustion reactions in Claus tail gas combustor 32 but also the oxygen required for the oxidation of $SO_2$ in the $SO_2$ converter. To reduce fuel consumption, the oxygen for $SO_2$ oxidation can be added between the Claus tail gas combustor 32 outlet and the $SO_2$ converter 40 inlet.

In FIG. 2 an integrated Claus/sulfuric acid process with injection of sulfuric acid in the Claus reaction furnace 66 according to the present disclosure is shown. A feedstock gas 2 rich in $H_2S$, sulfuric acid 56 and a gas rich in oxygen 72, as well as optionally a gas comprising a fuel and optionally, a second feedstock gas e.g. comprising a lower concentration of $H_2S$ and possibly $NH_3$ are directed to a Claus reaction furnace 66 and the combustion product is directed as an $O_2$ free Claus converter feed gas 4 to a converter 8. Between the outlet of the Claus reaction furnace 66 and Claus converter inlet 8, a waste heat boiler and optionally a sulfur condensation unit (not shown) are typically installed to reduce the temperature to the optimal working temperature for the Claus catalyst, optionally also withdrawing elemental sulfur formed in the Claus reaction furnace 66. The $O_2$ free Claus converter feed gas 4 is directed to contact an optional material catalytically active in conversion of $SO_3$ to $SO_2$ 10 (comprising e.g. one or more compounds of V, Mn, Fe, Co, Cu, Zn, Ni, Mo, W, Sb, Ti and Bi supported on one or more compounds of Al, Ti, Si, diatomaceous earth, Zr, Mg, and cordierite) and a material catalytically active in the Claus reaction 12, comprising e.g. aluminum oxide or titanium oxide, providing a Claus process product 14. The Claus process product 14 is directed to a sulfur condensation unit 16, providing condensed sulfur 18 and a Claus tail gas 20. The Claus tail gas 20 may optionally be further reacted in the presence of additional material catalytically active in the Claus process followed by further condensation of sulfur, in one to four further Claus stages (not shown here), to provide a final Claus tail gas. The final Claus tail gas comprising $H_2S$ 20 is directed to a Claus tail gas combustor 32, providing an $SO_2$ converter feed gas 34. To ensure oxidation of the compounds in the Claus tail gas, an $O_2$ rich gas 72 is directed to the Claus tail gas combustor 32.

The $SO_2$ converter feed gas 34 is typically cooled in a waste heat boiler (not shown) to provide optimal temperature for the first catalyst layer 42 in the $SO_2$ converter 40. The $SO_2$ converter feed gas 34 is directed to an $SO_2$ converter 40, containing one or more beds/layers of catalytically active material 42, 44, 46 optionally with interbed cooling, from which an $SO_3$ rich gas 48 is withdrawn. As the $SO_3$ rich gas contains water, the $SO_3$ may hydrate to form $H_2SO_4$. $H_2SO_4$ is condensed as concentrated sulfuric acid 52 in a sulfuric acid condenser 50. If the amount of water is insufficient for full hydration of $SO_3$, addition of steam in a position upstream the sulfuric acid condenser 50 may be preferred. From the sulfuric acid condenser 50 a substantially pure gas 62 may be withdrawn and directed to stack 64. Typically, all sulfuric acid 56 is recycled to the Claus reaction furnace 66, but optionally an amount of sulfuric acid may be withdrawn for other process purposes. For that purpose, an intermediate sulfuric acid tank (54) can be located between the sulfuric acid outlet of the sulfuric acid condenser 50 and the Claus reaction furnace 66, which may act as a buffer, decoupling operation of the Claus process from operation of the sulfuric acid process, which provides stability of the overall system.

An optional catalytic reactor 35 for oxidation of remaining impurities such as hydrocarbons, CO, COS, $CS_2$, S, $H_2$ and $H_2S$ is also shown in FIG. 2.

In a further embodiment, the entire amount of second feedstock containing $NH_3$ and $H_2S$ 70 is directed to the Claus tail gas combustor 32, eliminating the risk of $NH_3$-salt formation in the Claus condensers 16. In this embodiment a system for reduction of NOx 33, located between the Claus tail gas combustor 32 outlet and the inlet of the $SO_2$ converter 40 will be installed. Typically, a so-called SCR (Selective Catalytic Reaction) catalytic reactor will be used, requiring addition of $NH_3$ for the SCR reaction to proceed. The $NH_3$ addition can be from an external source or could be a small stream of the second feedstock containing $NH_3$ and $H_2S$ 70, which is then bypassed the Claus tail gas combustor.

In a further embodiment the conversion and condensation of sulfuric acid may be made in two stages, where remaining $SO_2$ from the first stage is further oxidized, hydrated and condensed, with the associated benefit of providing increased sulfur removal.

In a further embodiment, additional $SO_2$ conversion can be achieved by installing a tail gas cleaning plant downstream the sulfuric acid process. Numerous of these tail gas solutions exist, where alkaline scrubbers optionally combined with mist filters, are the most common type. Scrubbers using $H_2O_2$ or $NH_3$ are preferred as the effluent from these scrubbers is $H_2SO_4$ and $(NH_4)_2SO_4$ respectively, both of which can be recycled to the Claus reaction furnace for thermal destruction, i.e. eliminating a waste stream.

In a further embodiment the $SO_2$ converter feed gas 34 may be dried, such that the $SO_3$ rich gas 48 will contain little or no water. In that case the condenser 50 may be replaced with an absorber, in which $SO_3$ may be absorbed in sulfuric acid, to provide concentrated sulfuric acid, by a dry sulfuric acid process.

In a further embodiment an amount of elemental sulfur may also be transferred to the Claus tail gas combustor 32, which will have the effect of providing $SO_2$ to the sulfuric acid process without introduction of water, which may be beneficial if it is desired to increase the $SO_3$ concentration, which may be beneficial in a dry sulfuric acid process.

In a further embodiment an amount of fuel gas 68 is directed to the Claus tail gas combustor 32 to ensure sufficiently high temperature for complete oxidation of all reduced compounds in the Claus tail gas 20.

In a further embodiment, an amount of the feedstock gas 2 rich in $H_2S$ may also be split in an amount directed for the combustor of the Claus process 66 and an amount directed to the Claus tail gas combustor 32. This will reduce the need for fuel gas addition to the Claus tail gas combustor 32.

In a further embodiment a part of the Claus tail gas 20 is bypassed the Claus tail gas combustor 32 and combined with the hot off gas 34 from the Claus tail gas combustor in a gas mixing point just downstream the Claus tail gas combustor. This reduces the amount of fuel gas 68 needed for the Claus tail gas combustor to maintain a sufficiently high temperature. The combined Claus tail gas combustor off gas and bypassed Claus tail gas must have a mixed gas temperature in excess of 400° C. to ensure homogeneous (i.e. gas phase) oxidation of $H_2S$. To ensure complete oxidation of "difficult" species such as COS and CO, an optional oxidation catalyst 35 can be installed between the gas mixing point and inlet to the $SO_2$ converter 40. To ensure optimal control of the temperature to the oxidation catalyst, a waste heat boiler or any other heat exchanger can be installed between the gas mixing point and inlet to the oxidation catalyst. The oxidation catalyst typically comprises a noble metal such as Pt or Pd.

In a further embodiment the gas comprising oxygen 72 may be pure oxygen or atmospheric air enriched in oxygen, such that it comprises less than 50%, 20%, 10% or even 1% $N_2+Ar$.

EXAMPLE 1

The evaporation of sulfuric acid droplets has been numerically analyzed using a detailed mathematical model including
1. Heat transfer to droplet by convective heat transfer
2. Heat transfer to droplet by radiative heat transfer from gas molecules and hot refractory walls in the reaction furnace
3. Mass transfer between droplet and process gas
4. Detailed thermodynamics for sulfuric acid/water mixtures The atomization nozzle is assumed to be of the air assisted type, the initial droplet velocity is around 50 m/sec and the process gas flow velocity is around 10 m/sec.

The results of the simulations for 3 different reaction furnace temperatures are shown in FIG. 3. Sulfuric acid (93% w/w $H_2SO_4$) droplets enters the hot reaction furnace at low temperature and initially grows by absorbing water from the surrounding process gas. As the droplet heats up, primarily water is evaporated until the sulfuric acid concentration reaches around 98.5% w/w, which is the azeotrope concentration. From that point the droplet concentration and temperature does not change until the droplet is completely evaporated.

From the results it is seen that the initial droplet size is of relevance for the safe and long term operation of the Claus plant, especially if the residence time in the reaction furnace must be fixed at a value of 1-2 seconds. For 1 second residence time, droplets with initial diameters above 500 μm will not evaporate completely at 1,000° C. As seen, there is a temperature effect too, however the influence of the initial droplet diameter is much stronger.

EXAMPLE 2

The atomization of the sulfuric acid requires careful choice of nozzle type and operation of the nozzle. Numerous nozzles with their own characteristics regarding liquid capacity, pressure, type etc. exist in the market, ranging from very fine sprays with low capacity to coarse sprays with very large capacity, depending on the application.

For evaporation purposes, a small droplet size distribution is desired and for that purpose pneumatic nozzles (air-assisted, two phase) and hydraulic (pressure) nozzles are preferred, the former producing smaller droplets but with the "cost" of consumption of an atomization fluid, which is usually compressed air.

Based on data given in table 18-18 and 18-19 in Perry's Chemical Engineers Handbook, 4th edition (McGraw-Hill 1963), the $D_{0.9}$ value has been calculated and is shown in table 1. The $D_{0.9}$ defines the diameter, where 90% of the total mass (or volume) of the droplets have smaller diameters. The data are based on water as the liquid and air, in the case of pneumatic nozzles, at room temperature.

As seen in the table, the pneumatic nozzle produces the smallest droplets. The hydraulic nozzle also produces fine droplets, but with sizes up to 500 μm. Nozzle #2 and #3 only differ by the pressure of the liquid and it is seen that higher liquid pressure leads to smaller droplets. Although producing small droplets, the hydraulic nozzles may be an inferior choice if only 1 second residence time in the reaction furnace is allowed, but for 2 second residence time, the nozzles will work fine. See FIG. 3 for evaporation time of sulfuric acid droplets. For hydraulic nozzles, it should be considered to install an impaction wall or similar in the reaction furnace, such that most of the largest droplets will collide with the wall and evaporate within the reaction furnace.

TABLE 1

$D_{0.9}$ diameters (mass/volume based) for pneumatic and hydraulic nozzles. Data taken from table 18-18 and 18-19 in Perry's chemical engineers handbook, $4^{th}$ edition.

| Nozzle type | Nozzle #1 Pneumatic | Nozzle #2 Hydraulic | Nozzle #3 Hydraulic |
| --- | --- | --- | --- |
| Pressure of liquid/air | 0.3 barg | 6.9 barg | 13.8 barg |
| $D_{0.9}$ (mass/volume based) | 55 μm | 550 μm | 420 μm |

To document the effect of integrating a Claus process and a sulfuric acid process, four further examples have been analyzed for the process shown in FIG. 2, in comparison with the process of prior art as shown in FIG. 1.

These examples are based on the following feedstock gases:

Feed stock gas rich in $H_2S$ (stream 2 in FIGS. 1 and 2):
Total gas flow: 8190 $Nm^3/h$
$H_2S$ concentration: 94 vol %
$H_2O$ concentration: 6 vol %

The rich $H_2S$ gas is typical for refineries, and will also contain varying amounts of light hydrocarbons.

Feed stock gas rich in $H_2S$ and $NH_3$ (stream 70 in FIGS. 1 and 2):
Total gas flow: 3669 $Nm^3/h$
$H_2S$ concentration: 28 vol %
$NH_3$ concentration: 45 vol %
$H_2O$ concentration: 27 vol %

These streams comprising $H_2S$ and $NH_3$ are typically waste gases from so-called sour water strippers and recognized as SWS-gases. They may also contain varying amounts of light hydrocarbons.

The fuel gas is a light hydrocarbon mixture (primarily $CH_4$), with a lower heating value of 12,200 kcal/Nm3.

Feed streams, combustion air and Claus tail gas are preheated to the extent possible by utilizing heat evolved in the combined Claus+ sulfuric acid process.

In these examples the Claus process operates with 94-95% recovery of sulfur from the feed, i.e. can be a well operated Claus plant with only 2 catalytic stages.

EXAMPLE 3

Sequential Claus+ Sulfuric Acid Process According to Prior Art.

In example 3 all feed streams are treated in the Claus process, providing a stream of 11.7 t/h elemental sulfur and a Claus tail gas comprising ~5% of the S in the feed gases. In the Claus tail gas combustor, the sulfur species present in the Claus tail gas are oxidized and fuel gas is provided to maintain a combustor temperature of 1,000° C., such that all reduced species, such as CO, COS, $H_2$, $H_2S$, $S_x$ and $CS_2$, are fully oxidized to $CO_2$, $H_2O$ and $SO_2$.

The production of concentration sulfuric acid is 2.4 t/h, calculated as 100% w/w $H_2SO_4$.

The total sulfur and sulfuric acid recovery is >99.9% of the S in the feed, in compliance with even strict environmental legislation.

EXAMPLE 4

Recycle of $H_2SO_4$ to Claus Reaction Furnace.

In this example $H_2SO_4$ is not desired as a product and the entire acid production from the sulfuric acid process is recycled to the Claus reaction furnace. The amount of $H_2SO_4$ recycle corresponds to ~6% of the total S in the feed streams.

The total elemental sulfur product flow is now equal to the S in the feed streams, corresponding to 107% of the base case as described in example 3.

The temperature in the Claus reaction furnace decreases by –200° C. due to the evaporation and decomposition of the $H_2SO_4$, but the temperature is still well above the minimum for complete burnout of hydrocarbons and $NH_3$. No fuel gas is needed in the Claus reaction furnace.

As $H_2SO_4$ is an excellent $O_2$ carrier, the combustion air requirements decrease and thus the process gas volume decreases as the flow of inert $N_2$ decreases. Overall the process gas flow out of the Claus reaction furnace decreases to 94% of the base flow and the process gas flow out of the Claus tail gas combustor decreases to 93% due to this reduction in $N_2$ flow. As less process gas needs to be heated to 1,000° C. in the Claus tail gas combustor, the fuel gas consumption is only 92% of the base case.

The benefit of recycling $H_2SO_4$ has been found surprisingly high as not only has the sulfur forming capacity of the Claus plant increased by 7% but at the same time the process gas volume has been decreased by 6-7%. This corresponds to a Claus plant capacity increase of ~15%, provided that the process gas flow is at 100% of the base case.

EXAMPLE 5

Recycle of $H_2SO_4$ to Claus Reaction Furnace and SWS Gas Bypass to Claus Tail Gas Combustor.

In this example, fuel gas consumption in the Claus tail gas combustor has been minimized by bypassing a fraction of the SWS gas to the Claus tail gas combustor. The SWS gas has a high heating value and can easily act as a fuel gas. The concentrated $H_2S$ feed gas could also have been used, but since the SWS gas can be problematic in the Claus process and is unproblematic in the wet sulfuric acid process, the bypassing of SWS gas has greater benefits than bypassing the $H_2S$ gas. Process gas wise there will also be a reduction in gas volume as the NH3 in the SWS gas will increase the process gas volume in the Claus process due to the oxygen (air) requirements for combustion of $NH_3$ to $N_2$ and $H_2O$.

The amount of SWS gas recycled is adjusted such that 1,000° C. is achieved in the Claus tail gas combustor, ensuring complete burnout of reduced species from the Claus tail gas, such as $H_2S$, COS, CO, $H_2$, $S_x$ and $CS_2$.

Since the fuel gas in the Claus tail gas combustor now contains $H_2S$, the $H_2SO_4$ production will increase, now accounting for ~13% of the S in the feed streams. This large amount of sulfuric acid recycle result in a significant reduction in Claus reaction furnace temperature.

With proper feed stream preheating it is still possible to achieve sufficiently high temperature in the Claus reaction furnace without needing support fuel.

The effect on the size of the Claus process is substantial: the process gas volume is reduced to 65% of the base case, still with 107% elemental sulfur production. This process gas volume reduction can be either used for capacity boosting of an existing plant or significant cost reduction of a new plant.

Also the sulfuric acid plant will become smaller as the process gas flow is only 90% of the base case flow. This is surprising as the $H_2SO_4$ production has been more than doubled compared to the base case, but it is mainly due to the large reduction in Claus tail gas flow.

What is most remarkable is the reduction in fuel gas consumption that is now only 16% of the base case flow, contributing to a significantly lower operational cost of the integrated Claus+ sulfuric acid process.

EXAMPLE 6

Recycle of $H_2SO_4$ and Complete Bypass of SWS Gas to Claus Tail Gas Combustor

This example focus on the complete elimination of the SWS gas to the Claus plant, ensuring that ammonia salt formation in the sulfur condensers is impossible and thus decreases the risk of failure of the Claus plant.

The process gas flow out of the Claus reaction furnace is 69% of the base case, but a little higher compared to example 5 where only a fraction of the SWS gas is bypassed. The increase in process gas flow is due to requirement of fuel gas addition to the Claus reaction furnace to maintain the high operating temperature.

The $H_2SO_4$ production in the wet sulfuric acid plant has now increased to 17% of the S in the feed gases, recycling of the entire production now quenches the Claus reaction furnace temperature to an extent where fuel gas is required. The process gas from the Claus tail gas combustor has increased to 107% of the base case, due to the increased sulfur feed to the sulfuric acid plant.

Even if fuel gas is needed in the Claus reaction furnace, the total flow of fuel gas is only 41% of the base case.

From a plant size and operational cost point of view, this example seems less optimal than example 5, i.e. there is an optimum of $H_2SO_4$ recycle ratio which depends on the actual feed gas flows and compositions. Bypassing even more feed stock gas will result in an increased sulfuric acid production, which will quench the Claus reaction furnace even more which again will require more fuel gas and therefore the Claus tail gas flow will increase.

For the feed gas compositions and flows described above, the optimum with regard to plant sizes and fuel consumption is with a $H_2SO_4$ recycle flow between 13% and 17% of the S feed in the feed streams.

In general, the optimal feed stock gas bypass is close to the point where the Claus reaction furnace operates at the minimum allowable temperature, i.e. the feed stock can be bypassed to produce more sulfuric acid until the Claus reaction furnace temperature reaches the limit for thermal destruction of hydrocarbons and sulfuric acid. Increasing the feed stock bypass ratio will reduce the fuel gas need in the Claus tail gas combustor, but will increase the fuel gas consumption in the Claus reaction furnace by a much larger ratio as the fuel gas in the Claus reaction furnace need to evaporate and decompose the sulfuric acid and heat up the process gas, whereas in the Claus tail gas combustor only heating up of process gas is required.

For a feed stock gas with e.g. 50 vol % $H_2S$, the optimal $H_2SO_4$ recycle flow is ~7% of the S feed in the feed stream. The acid gas bypass to the Claus tail gas combustor is only 2% as the relatively low $H_2S$ concentration result in a low temperature in the Claus reaction furnace and thus the sulfuric acid will quickly reduce the temperature and require fuel gas addition in the Claus reaction furnace. Using $O_2$ enriched air in the Claus reaction furnace will allow for a higher $H_2SO_4$ recycle flow.

EXAMPLE 7

Recycle of $H_2SO_4$, Bypass of SWS Gas to Claus Tail Gas Combustor and Use of $O_2$ Enriched Air.

To boost Claus plant capacity, a well-known revamp option is to install special burners which can handle enriched air with >21 vol % $O_2$, a common $O_2$ quality is 93-99 vol % $O_2$.

In this example an enriched air with 80 vol % $O_2$ is used as in the Claus process, whereas atmospheric air is used in the sulfuric acid process.

The effect of the enriched air is a significantly reduced process gas flow out of the Claus reaction furnace, mainly due to the reduced amount of $N_2$ associated with the $O_2$ flow. Also the lower process gas flow enables operation of the Claus reaction furnace without fuel addition, as less inert gas has to be heated.

Since the process gas flow out of the Claus reaction furnace is now reduced to only 38% of the base case, the Claus tail gas feed to the Claus tail gas combustor is also significantly decreased. The process gas out of the Claus tail gas combustor is only 56% of the base case, it is relatively higher than the Claus plant flow due to the large amount of SWS gas bypass to the wet sulfuric acid plant.

With this layout it is possible to operate without fuel gas in both Claus and sulfuric acid processes, even with this high recycle flow of $H_2SO_4$ from the sulfuric acid process.

TABLE 2

|  | Example 23 | Example 4 | Example 5 | Example 6 | Example 7 |
| --- | --- | --- | --- | --- | --- |
| Sulfur production | 100% | 107% | 107% | 107% | 107% |
| $H_2SO_4$ production | 6% | No | No | No | No |
| $H_2SO_4$ recycle | 0% | 6% | 13% | 17% | 13% |
| Acid gas feed to Claus | 100% | 100% | 100% | 100% | 100% |
| SWS gas feed to Claus | 100% | 100% | 33% | 0% | 19% |
| Process gas out Claus reaction furnace | 100% | 94% | 65% | 69% | 38% |
| Process gas out Claus tail gas combustor | 100% | 93% | 90% | 107% | 56% |
| Fuel gas consumption | 100% | 92% | 16% | 41% | 0% |

The invention claimed is:

1. A process for production of sulfur from a feedstock gas comprising from 15% to 100 vol % $H_2S$ and a stream of sulfuric acid, the process comprising:
   a. providing a Claus reaction furnace feed stream comprising said feedstock gas, an amount of sulfuric acid, an amount of oxygen and optionally an amount of fuel, wherein the amount of oxygen is substoichiometric,
   b. directing said Claus reaction furnace feed stream to a Claus reaction furnace operating at elevated temperature, providing a Claus converter feed gas,
   c. cooling said Claus converter feed gas to provide a cooled Claus converter feed gas and optionally withdrawing elemental sulfur from the gas,
   d. directing said cooled Claus converter feed gas after optional reheating to contact a material catalytically active in the Claus reaction,
   e. withdrawing a Claus tail gas and elemental sulfur, optionally by cooling the effluent from said material catalytically active in the Claus reaction,
   f. directing a stream comprising said Claus tail gas to a Claus tail gas treatment, wherein said sulfuric acid directed to said Claus reaction furnace being in the form of droplets with a droplet size distribution characterized by 90% of the mass of the droplets having a diameter below 500 μm.

2. A process according to claim 1, wherein at least an amount of the sulfuric acid is directed to said Claus reaction furnace via at least one pneumatic nozzle, receiving sulfuric acid and an atomization medium.

3. A process according to claim 2, in which the atomization medium is compressed air and the flow is from 25 $Nm^3$ air/ton acid to 500 $Nm^3$ air/ton acid.

4. A process according to claim 1, wherein at least an amount of the sulfuric acid is directed to said Claus reaction furnace via at least one hydraulic nozzle.

5. A process according to claim 1, wherein the average process gas residence time in the Claus reaction furnace is less than 5 seconds.

6. A process according to claim 1, wherein the Claus reaction furnace comprises a turbulence enhancer.

7. A process according to claim 1, wherein the Claus reaction furnace comprises a means of impaction.

8. A process according to claim 1, wherein said Claus tail gas treatment comprises
   g. directing a stream comprising said Claus tail gas, oxygen and a fuel as a feedstock gas to a Claus tail gas combustor operating at a temperature above 900° C. or a catalytic means for oxidation providing an $SO_2$ converter feed gas,
   h. directing said $SO_2$ converter feed gas to contact a material catalytically active in $SO_2$ oxidation to $SO_3$, providing an $SO_3$ rich gas,
   i. converting said $SO_3$ rich gas to concentrated sulfuric acid, either by absorption of $SO_3$ in sulfuric acid or by hydration of $SO_3$, cooling and condensation of sulfuric acid,
   j. recycling at least a part of the produced sulfuric acid to the Claus reaction furnace.

9. Process according to claim 1, in which an amount of sulfuric acid is from a source other than a Claus tail gas treatment.

10. A process according to claim 1, wherein the amount of sulfur in the stream of sulfuric acid is higher than 1% and less than 25% of the total amount of elemental sulfur withdrawn from the process.

11. A process plant comprising a Claus reaction furnace, a Claus waste heat boiler, a Claus conversion section, a Claus tail gas combustor and a sulfuric acid section, wherein the Claus reaction furnace has a furnace inlet, an acid nozzle inlet and an outlet, the Claus waste heat boiler has a gas inlet, a gas outlet and an elemental sulfur outlet, the Claus conversion section has a gas inlet, a gas outlet and an elemental sulfur outlet, the Claus tail gas combustor has an inlet and an outlet and the sulfuric acid section has a gas inlet, a gas outlet and a sulfuric acid outlet, and wherein the inlet of the Claus reaction furnace is configured for receiving a feedstock gas and an oxidant, and the outlet of the Claus reaction furnace is configured for being in fluid communication with the inlet of the Claus waste heat boiler, wherein the outlet the Claus waste heat boiler is configured for being in fluid communication with the inlet of the Claus conversion section and wherein the inlet of the Claus tail gas combustor is configured for being in fluid connection with the outlet of said Claus conversion section gas outlet, the Claus tail gas combustor outlet is configured for being in fluid connection with the inlet of the sulfuric acid section, wherein the sulfuric acid outlet of the sulfuric acid section is in fluid communication with the acid nozzle inlet of said Claus reaction furnace.

12. A process plant according to claim 11, further comprising a sulfur storage tank having a volume corresponding to the amount of sulfuric acid withdrawn from the sulfuric acid outlet of the sulfuric acid section in from 1 day to 4 days.

\* \* \* \* \*